(12) United States Patent
De Silva et al.

(10) Patent No.: US 11,199,631 B2
(45) Date of Patent: Dec. 14, 2021

(54) APPARATUS AND METHODS FOR GEO-LOCATING ONE OR MORE OBJECTS

(71) Applicants: Dilhar Mihidu De Silva, League City, TX (US); Frank Mease, Tomball, TX (US)

(72) Inventors: Dilhar Mihidu De Silva, League City, TX (US); Frank Mease, Tomball, TX (US)

(73) Assignee: CRITERIONIX, L.L.C., Houston, TX (US)

( * ) Notice: Subject to any disclaimer, the term of this patent is extended or adjusted under 35 U.S.C. 154(b) by 409 days.

(21) Appl. No.: 15/946,516

(22) Filed: Apr. 5, 2018

(65) Prior Publication Data

US 2018/0292541 A1    Oct. 11, 2018

Related U.S. Application Data

(60) Provisional application No. 62/483,228, filed on Apr. 7, 2017.

(51) Int. Cl.

| | |
|---|---|
| *G01S 19/45* | (2010.01) |
| *G01S 17/10* | (2020.01) |
| *G01S 19/49* | (2010.01) |
| *G01S 17/86* | (2020.01) |
| *G01S 17/06* | (2006.01) |

(52) U.S. Cl.
CPC .............. *G01S 19/45* (2013.01); *G01S 17/06* (2013.01); *G01S 17/10* (2013.01); *G01S 17/86* (2020.01); *G01S 19/49* (2013.01)

(58) Field of Classification Search
CPC ............ G01S 19/45; G01S 17/06; G01S 17/86
See application file for complete search history.

(56) References Cited

U.S. PATENT DOCUMENTS

| | | | |
|---|---|---|---|
| 5,166,789 A | 11/1992 | Myrick | |
| 5,568,152 A | 10/1996 | Janky et al. | |
| 5,669,174 A * | 9/1997 | Teetzel | F41A 9/62 356/5.01 |
| 5,949,373 A * | 9/1999 | Eslambolchi | F17D 5/00 342/357.25 |

(Continued)

OTHER PUBLICATIONS

U.S. Appl. No. 61/233,105; Nielsen et al., filed Aug. 11, 2009.
U.S. Appl. No. 61/291,017; Nielsen et al., filed Dec. 30, 2009.

*Primary Examiner* — Cassi J Galt
(74) *Attorney, Agent, or Firm* — Edmonds & Cmaidalka, P.C.

(57) ABSTRACT

Apparatus and methods for geo-locating an object. In some examples, a device for determining a geolocation of an object can include a receiver, a signal generator, a detector, and a central processing unit. The receiver can be configured to receive a location signal from a navigation satellite system. The signal generator can be configured to emit an electromagnetic radiation signal of visible light onto an object to be geolocated. The detector can be configured to receive a reflection of the emitted electromagnetic radiation signal of visible light from the object. The central processing unit can be configured to provide geographic coordinates of the device and geographic coordinates of the object based on the reflection of the emitted electromagnetic radiation signal of visible light from the object.

16 Claims, 4 Drawing Sheets

(56) References Cited

U.S. PATENT DOCUMENTS

| | | | | |
|---|---|---|---|---|
| 6,052,083 | A * | 4/2000 | Wilson | G01C 15/00 |
| | | | | 342/357.34 |
| 6,459,989 | B1 | 10/2002 | Kirkpatrick et al. | |
| 7,202,941 | B2 * | 4/2007 | Munro | G01S 7/483 |
| | | | | 356/4.1 |
| 7,295,296 | B1 | 11/2007 | Galli | |
| 7,510,029 | B2 | 3/2009 | Gunsaulis et al. | |
| 7,518,713 | B2 | 4/2009 | Ash | |
| 8,049,658 | B1 | 11/2011 | Lagonik et al. | |
| 8,400,619 | B1 * | 3/2013 | Bachrach | G01C 1/04 |
| | | | | 356/4.01 |
| 8,909,470 | B2 | 12/2014 | Denk | |
| 9,074,892 | B2 | 7/2015 | Fink | |
| 9,250,328 | B2 * | 2/2016 | Ashjaee | G01S 19/14 |
| 9,292,764 | B2 | 3/2016 | Yun et al. | |
| 9,292,813 | B2 * | 3/2016 | Tucker | A01B 69/008 |
| 9,310,165 | B2 * | 4/2016 | Bell | F41A 23/14 |
| 9,377,533 | B2 | 6/2016 | Smits | |
| 9,625,602 | B2 | 4/2017 | Olsson | |
| 2003/0164789 | A1 | 9/2003 | Taylor, Jr. et al. | |
| 2006/0100816 | A1 * | 5/2006 | Prentice | G01C 15/00 |
| | | | | 702/127 |
| 2009/0002677 | A1 | 1/2009 | Lindquist et al. | |
| 2011/0109437 | A1 | 5/2011 | Olsson | |
| 2011/0191058 | A1 | 8/2011 | Nielsen et al. | |
| 2011/0285982 | A1 | 11/2011 | Breed | |
| 2012/0059575 | A1 | 3/2012 | Hartman et al. | |
| 2014/0018094 | A1 | 1/2014 | Oren et al. | |
| 2015/0355328 | A1 | 12/2015 | Maryfield et al. | |

* cited by examiner

APPARATUS AND METHODS FOR GEO-LOCATING ONE OR MORE OBJECTS

CROSS-REFERENCE TO RELATED APPLICATION

This application claims priority to U.S. Provisional Patent Application No. 62/483,228, filed Apr. 7, 2017, which is incorporated by reference herein.

BACKGROUND

Field

Embodiments described generally relate to apparatus and methods for geo-locating one or more objects.

Description of the Related Art

Survey equipment is utilized to locate stationary objects or boundaries on the earth or within the earth, such as land acreage boundaries, above ground structures, and below ground structures. The survey equipment generally includes a theodolite or total station resting upon a bipod or tripod base and a roving stick or roving station that is walked from point to point to identify each points' latitude, longitude, and elevation. The survey equipment is bulky and requires careful set up and co-location above the point to be surveyed or requires a person to carefully utilize a targeting scope through which the person views the object to be located using cross hairs or other visually accessible cues within the scope.

Other types of location devices include range finders that are popular with golfers. These devices work by aiming the device through a view port or targeting scope at an object on the course, such as the cup on a green, and pushing a button or pulling a trigger on the range finder to determine the distance to the object (the cup). The distance to the object is typically displayed inside the view port. Range finders, however, are not capable of providing a geolocation of the object.

There is a need, therefore, for new apparatus and methods that can geo-locate an object while not requiring a targeting scope.

SUMMARY

Apparatus and methods for geo-locating one or more object are provided. In some examples, a device for determining a geolocation of an object can include a receiver, a signal generator, a detector, and a central processing unit. The receiver can be configured to receive a location signal from a navigation satellite system. The signal generator can be configured to emit an electromagnetic radiation signal of visible light onto an object to be geolocated. The detector can be configured to receive a reflection of the emitted electromagnetic radiation signal of visible light from the object. The central processing unit can be configured to provide geographic coordinates of the device and geographic coordinates of the object based on the reflection of the emitted electromagnetic radiation signal of visible light from the object.

In some examples, a system for determining a location of an object can include a base station and a Real-Time Kinematics system. The Real-Time Kinematics system can include a receiver, a signal generator, a detector, and a central processing unit. The receiver can be configured to receive a location signal from a navigation satellite system. The signal generator can be configured to emit an electromagnetic radiation signal of visible light onto an object to be geolocated. The detector can be configured to receive a reflection of the emitted electromagnetic radiation signal of visible light from the object. The central processing unit can be configured to provide the geographic coordinates of the device and the geographic coordinates of the object based on the reflection of the emitted electromagnetic radiation signal of visible light from the object.

In some examples, a method for determining a location of a surface can include receiving a location signal from a navigation satellite system. The method can also include emitting an electromagnetic radiation signal of visible light onto an object. The method can also include detecting a reflection of the emitted electromagnetic radiation signal of visible light from the object. The method can also include calculating geographic coordinates of the device, a distance of the object from the device, and geographic coordinates of the object. The method can also include storing the geographic coordinates of the object in a memory device. The method can also include stabilizing the electromagnetic radiation signal of visible light.

DETAILED DESCRIPTION

Figure 1:
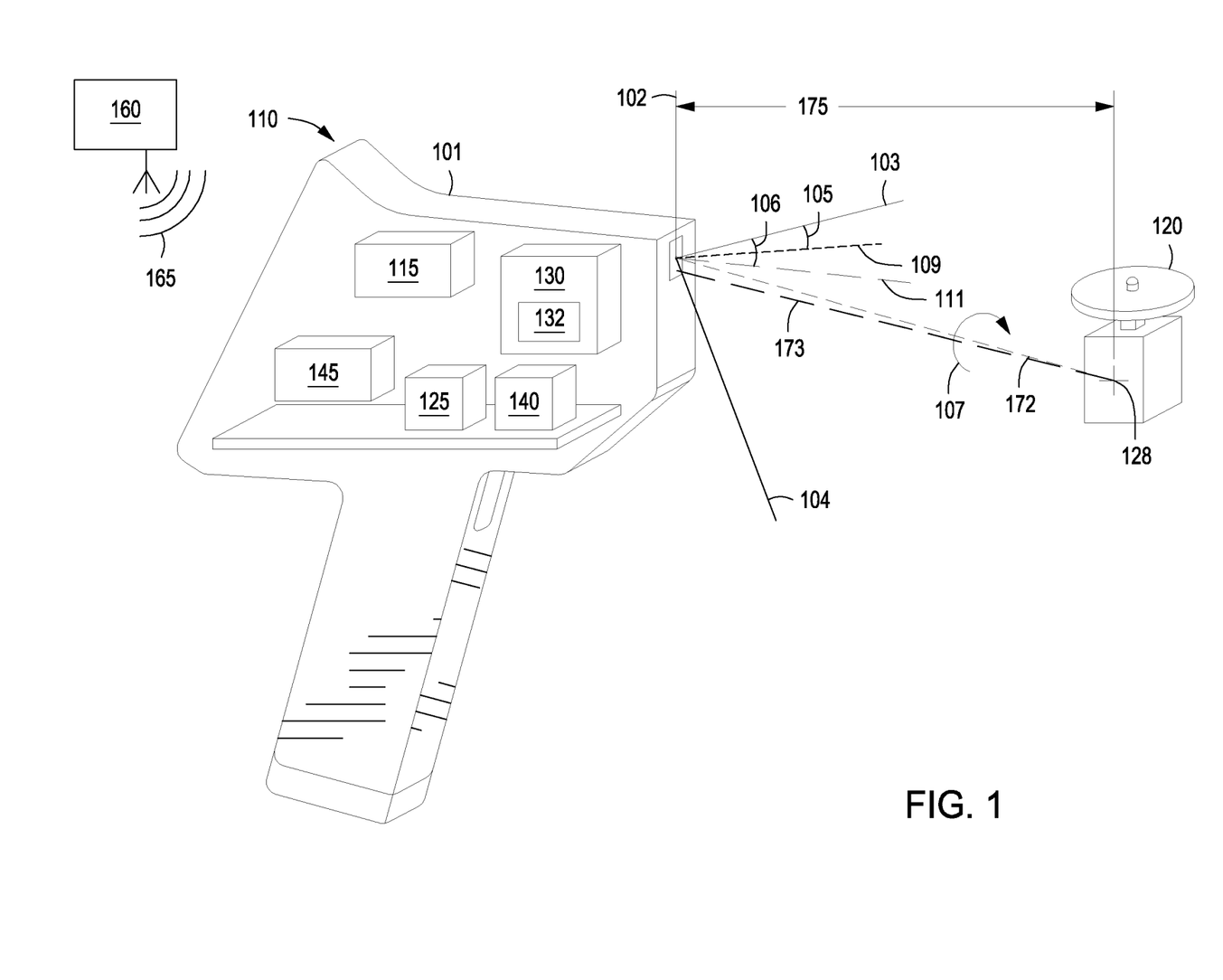
FIG. 1 depicts an illustrative device for determining a geolocation of an object, according to one or more embodiments described.

FIG. 1 depicts an illustrative device 110 for determining a geolocation of an object 120, according to one or more embodiments. The device 110 can include a receiver 115, a signal generator 130, a detector 132, and a central processing unit 140. In some examples, the device 110 can include a body or enclosure 101 that can house, at least partially or completely, any one or more of the receiver 115, the signal generator 130, the detector 132, and the central processing unit 140. The receiver 115 can receive a location signal 165 from a navigation satellite system 160. The signal generator 130 can emit one or more electromagnetic radiation signals of visible light 172 onto an object 120 for determining the geolocation of the object 120. The detector 132 can receive a reflection of the emitted electromagnetic radiation signal of visible light 173 from the object 120.

The central processing unit (CPU) 140 can be configured or adapted to calculate the geographic coordinates of the device 110 from the location signal 165. The central processing unit 140 also can be configured or adapted to calculate a distance 175 of the object 120 or a specific point or location on a surface 128 of the object 120 relative to the location of the device 110 using information obtained from the reflection of the emitted electromagnetic radiation signal of visible light 173. The central processing unit 140 can also be configured or adapted to calculate the geographic coordinates (i.e., the geolocation) of the object 120 or a specific point or location on a surface 128 of the object 120 using the calculated distance 175 and a three dimensional pointing direction of the electromagnetic radiation signal of visible light 172 relative to axes 102, 103, and 104. The axes 102, 103, and 104 represent a local horizontal/local vertical orientation of the device 110 relative to a land mass; a sea level; a reference ellipsoid; a real-world longitude, latitude, elevation, and direction; and/or an Earth Centered, Earth Fixed (ECEF) coordinate system or other coordinate system.

Geolocation refers to the identification or estimation of the real-world geographic location of an object, e.g., the object 120, or the surface of an object, e.g., the surface 128 of the object 120. Geolocation can include the generation of the real-world geographic coordinates of the object 120 or the surface 128 of the object 120 and/or any other object or surface thereon. Geographic coordinates can enable locations on Earth to be specified by a set of numbers, letters, symbols, or any combination thereof. For example, the geographic coordinates can be a set of numbers that can be chosen such that one of the numbers can represent a vertical position in space along a line from the center of the earth to the geographic or magnetic north pole, and two or three of the numbers can represent a horizontal position in space about the earth's equator. The numbers can also represent the longitude, latitude, and elevation of an object's location in space above or below the earth's surface or sea level as well as locations above or below other celestial bodies.

In some examples, the device 110 can also include at least one inertial measurement unit (IMU) 145. In some examples, the device 110 can also include at least one real-time clock (RTC) 125. The inertial measurement unit 145 can be configured or adapted to determine a three-dimensional pointing direction or orientation of the device 110 and/or the three-dimensional pointing direction of the electromagnetic radiation signal of visible light 172 relative to the axes 102, 103, and 104, at any given time. The relative three dimension pointing direction of the electromagnetic radiation signal of visible light 172 can be defined, at least in part, as a roll orientation or a roll angle 107, a yaw orientation or a yaw angle 106, and a pitch orientation or a pitch angle 105. The roll orientation 107 can be depicted as a vector about the three dimensional pointing direction of the electromagnetic radiation signal of visible light 172. The yaw orientation 106 of the electromagnetic radiation signal of visible light 172 can be depicted by the angle between axis 103 and a projection of a two-dimensional reflection 111 of the electromagnetic radiation signal of visible light 172 onto the plane defined by axes 103 and 104. The pitch orientation 105 of the electromagnetic radiation signal of visible light 172 can be depicted by the angle between axis 103 and a projection of a two-dimensional reflection 109 of the electromagnetic radiation signal of visible light 172 onto the plane defined by axes 102 and 103. The orientation data from the inertial measurement unit 145 can be processed along with information from the real-time clock 125 to determine the roll orientation 107, the yaw orientation 106, and/or the pitch orientation 105 of the device 110, relative to the axes 102, 103, and 104, at any given time and/or to determine the relative three dimension pointing direction of the electromagnetic radiation signal of visible light 172 relative to the axes 102, 103, and 104 at any given time. From the information obtained from the reflected signal of visible light 173 and the relative three dimension pointing direction of the electromagnetic radiation signal of visible light 172 relative to the axes 102, 103, and 104, the central processing unit 140 can be configured or adapted to calculate the geographic coordinates (i.e., geolocation) of the object 120 based on the distance 175 of the object 120 from the device 110, the geographic coordinates of the device 110, and the three dimensional pointing direction of the electromagnetic radiation signal of visible light 172 relative to the axes 102, 103, and 104.

In some examples, the inertial measurement unit 145 can include one or more gyroscopes, one or more accelerometers, and/or one or more magnetometers. The one or more gyroscopes can be or include microelectromechanical systems (MEMS). The microelectromechanical systems can be etched from silicon and can act like miniature springs and weights that measure torsion by changing a capacitance in a sensor of the microelectromechanical systems. The inertial measurement unit 145 can utilize at least some of the information from one or more sensors of the microelectromechanical systems to determine roll and pitch orientations of the device 110.

The inertial measurement unit 145 can determine compass positions or the yaw direction of the device 110 by utilizing one or more electronic sensors, Hall effect sensors, and/or magnetometers utilizing the Hall effect. The Hall effect occurs when a magnetic field is applied transverse to a flowing current. The magnetic field deflects the moving charges that make up the current, inducing a voltage, called the Hall voltage, which is transverse to the current. The Hall voltage can then be measured by the one or more electronic sensors, Hall effect sensors, and/or magnetometers and the measured voltage can be utilized to determine the strength of the component of the magnetic field that was transverse to the current. Multiple electronic sensors, Hall effect sensors, and/or magnetometers oriented in two or more axes can be used within the inertial measurement unit 145 to measure the total magnetic field vector and determine the orientation of the device 110 relative to the Earth's magnetic field and/or yaw direction of the device 110. The one or more magnetometers can assist in calibrating the inertial measurement unit against orientation drift. The inertial measurement unit 145 can be configured or adapted to generate orientation data associated with the relative orientation of the device 110 in space, such as elevation and direction, at any given time.

The navigation satellite system 160 can include, but is not limited to, one or more Global Navigation Satellite Systems (GNSS) and/or regional satellite navigation systems. GNSS is an umbrella term used for global systems. There are also regional satellite navigation systems, and some of those regional systems may one day be upgraded to global systems. GNSSs provide coverage over all or most of the world. Regional satellite navigation systems provide coverage to one or more geographic areas, but do not provide coverage over all of the world. Regional systems typically augment a global system, but some regional satellite navigation systems can be used as stand-alone systems.

Examples of global navigation satellite systems (NSSs) include the NAVSTAR Global Positioning System (GPS) system, the Russian Global Satellite Navigation System (GLONASS), the European Galileo system. China has a regional NSS, the BeiDou NSS, that they are upgrading to a GNSS, to be named the BeiDou-2 GNSS. India has a satellite-based augmentation system that enhances the accuracy of NAVSTAR GPS and GLONASS positions for regional use. India has also launched the Navigation with Indian (NAVIC) NSS, a constellation of satellites for navigation in and around the Indian Subcontinent. At least France and Japan are in the process of developing regional NSSs as well.

Common geographic coordinates can include, but are not limited to, latitude, longitude, elevation; GPS coordinates; GLONASS coordinates; Galileo coordinates, BeiDou coordinates, and/or NAVIC coordinates, as well as relative heading or direction. The elevation can be an altitude or a depth relative to the surface of the earth. The GPS system includes about 24 satellites in its constellation and was developed by the U.S. Department of Defense. The GPS system can be accessed anywhere on or near the Earth and a GPS receiver can be used to determine the location of the GPS receiver. The GPS system provides navigation capabilities to military, civil, and commercial users worldwide and is freely accessible to anyone with a GPS receiver. The GLONASS also includes about 24 satellites, was developed by the Soviet Union, and is operated by the Russian Aerospace Defense Forces. The GLONASS signals are similarly available to users having a compatible receiver.

The real-time clock 125 can be or can include one or more computer clocks, one or more atomic clocks, or any clock capable of keeping time. Generally, the real-time clock 125 can be or can include an integrated circuit that keeps track of the current time. In some examples, the real-time clock 125 can regulate time with the use of a crystal oscillator and do not need to rely on clock signals. The real-time clock 125 can be powered by an independent power source, not shown, such as a battery, so that the real-time clock 125 can keep accurate time even when the device 110 is not powered. Although the term real-time clock often refers to the devices in personal computers, servers, and embedded systems, real-time clocks can be present in almost any electronic device that needs to keep time or one may want to keep time.

The receiver 115 can include an antenna and electronics configured or adapted to receive radio frequency signals. For example, the receiver 115 can be configured or adapted to receive location signals 165 from the GPS navigation satellite system; the GLONASS; the Galileo navigation satellite system, the BeiDou navigation satellite system, the BeiDou-2 navigation satellite system, and/or the NAVIC navigation satellite system. Two or more receivers 115 can each be configured or adapted to receive one or more location signals 165 from one or more navigation satellite systems. The receiver 115 can be configured or otherwise provided with one or more reference ellipsoids that the receiver 115 can use to determine its location based on the location signals 165 received by the receiver 115. A reference ellipsoid is a mathematically defined surface that approximates a geoid of the Earth or other planetary body. The reference ellipsoids can be the ellipsoids defined by datum WGS-84, North American Datum 1983 (NAD-83), and/or datum NAD 83 Conus, and/or one or more other datum associated with one or more navigation satellite systems. The geoid of the Earth approximates the irregular shape of the Earth or other planetary body and can be utilized as the true zero surface for measuring depths or altitudes, topographic or bathymetric elevations, and/or orthometric heights. For the Earth, the geoid can be the mean sea level (MSL) for the Earth. The mean sea level can be a tidal datum that is can be the arithmetic mean of hourly water elevations observed over a specific 19-year cycle. Example reference geoids of the Earth can include Goeid99, a model with a submeter level of accuracy developed by the National Geodetic Survey; EGM96, a model with submeter level of accuracy developed in collaboration by NASA Goddard Space Flight Center, the National Imagery and mapping Agency (NIMA), and Ohio State University; and other known geoid datum. The receiver 115 can be configured or adapted to utilize the location signals 165 from two, three, four, or more satellites in the navigation satellite system 160, in conjunction with the reference ellipsoid(s) to determine the geographic coordinates of the receiver 115 and/or the device 110. The location signals 165 can include ranging signals, satellite ephemeris data, and times that the receiver 115 can utilize to determine the geographic coordinates of the receiver 115 and/or the device 110.

In some examples, the receiver 115 can be located such that it can receive the location signals 165 from five satellites orbiting above the receiver 115 within the navigation satellite system 160. The location signal 165 can include ranging signals that can be used to measure the distance to the satellite, pseudorandom codes that identify which satellite is transmitting particular information, and navigation messages. The navigation messages can include ephemeris data containing information about the status of the satellite, the current date, and time, any one or more of which can be utilized to calculate the position of each satellite in orbit. The navigation messages can also include information about the time and status of some or all of the satellites in the satellite constellation, called the almanac. The almanac provides information about where each satellite in the navigation satellite system 160 should be at any time throughout the day. The receiver 115 can be configured or adapted with an algorithm, sometimes referred to as the ephemeris algorithm, that can compute satellite Cartesian coordinates in the reference ellipsoid, for example WGS-84. Reference ellipsoid WGS-84 is defined by an origin at the Earth's center or mass. In the WGS-84 reference ellipsoid, the Z axis points towards the North Pole, the X axis points toward the Prime Meridian (which crosses Greenwich), and the Y axis is at a right angle relative to the X and Z axis in the WGS-84 datum coordinate system.

The location signals 165 from GPS satellites include 4 signals for civilian use, which are: L1 C/A, L2C, L5 and L1C. L1 C/A is also called the legacy signal and is currently broadcast by all GPS satellites. The other signals are called modernized signals and may not be broadcast by all GPS satellites. In addition, there are restricted signals, also broadcast to the general public, but whose encoding is secret and are intended to be used only by authorized parties. Nonetheless, some limited use of restricted signals can be made by civilians without access to the secret encoding details; this is called codeless and semi-codeless access, and is officially supported.

The distance or range to each satellite 160 can be measured using time data sent from each satellite 160 and a time generated by the real-time clock 125. The location signal 165 from each satellite 160 can include a time generated by a real-time clock, not shown, on each satellite 160. The receiver 115 can compare the received time from the satellite 160 to the time generated by the real-time clock 125 and can compute the range to each satellite 160 by using the time difference multiplied by the speed of light. The process of receiving and comparing the received time from the satellite 160 is sometimes referred to as tracking a satellite. From the calculated distances, the one or more receivers 115 can calculate the geographic coordinates of the device 110.

The signal generator 130 can generate an electromagnetic radiation signal in the visible spectrum or other signals that can be distinguished by the human eye and brain, herein known as visible light. An electromagnetic radiation signal in the visible spectrum is a signal within the electromagnetic spectrum that is visible to the human eye. A typical human eye and brain can react to and distinguish wavelengths from about 390 nm to about 700 nm, which corresponds to a frequency band in the vicinity of about 430 THz to about 770 THz. The wavelengths from about 390 nm to about 700 nm do not however contain all the colors that the human eyes and brain can distinguish. Unsaturated colors such as magenta, or other purple variations, as well as pink are absent from the wavelengths described above but are still visible to the human eye, for example, because they can be generated only by a mix of multiple wavelengths. The signal generator 130 can generate an electromagnetic radiation signal from a series of photons such that even if the photons are outside the visible spectrum, the signal can still be distinguished by the human eye and brain. For example, if a pigment molecule in the retina is hit in rapid succession by a pair of photons with wavelengths of about 1,000 nanometers long, those photons will deliver the same amount of energy as a single hit from a 500 nanometer wavelength photon, allowing the signal to be distinguished by the eye and brain. In some examples, the signal generator 130 can generate an electromagnetic radiation signal outside the visible light spectrum and the electromagnetic radiation signal outside the visible light spectrum can be perceived by a human utilizing optically enhanced vision.

The signal generator 130 can be or can include a laser range finder or any type of range finder. A laser rangefinder can use a laser beam or an electromagnetic radiation signal of visible light 172 to determine the distance 175 from the one or more signal generators 130 to the one or more surfaces 128. In one example of a rangefinder, the rangefinder can operate on the time of flight principle by sending a laser pulse toward a specific surface 128 and measuring the time taken by the pulse reflected 173 off the specific surface 128 and returned to a detector 132. The precision of the measured distance 175 is typically determined by the rise or fall time of the laser pulse and the speed of the detector 132. In one or more examples, the signal generator 130 can determine the distance 175 to within about 10 cm, about 8 cm, about 7 cm, about 6 cm, about 5 cm, about 4 cm, about 3 cm, about 2 cm, about 1 cm, about 5 mm, about 1 mm or less.

An electronic and/or mechanical stabilizer, not shown, can be configured or adapted to reduce vibration in the signal generator 130 and/or the detector 132 that may be present while the device 110 is emitting the electronic radiation signal of visible light 172. By stabilizing the signal generator 130 and/or the detector 132, the electromagnetic radiation signal of visible light 172 can be adjusted to remain steady while the surface 128 is illuminated during operation of the device 110. For example, if the device 110 is a hand-held device, stabilizing the signal generator 130 and/or the detector 132, can reduce or eliminate vibrations introduced during operations into the device 110 by an unsteady hand of a person holding or otherwise operating the device 110.

It should be understood that by utilizing the electromagnetic radiation signal of visible light 172, the device 110, in some examples, can be free from any visual targeting scope. A person can operate the device 110 and utilize the electromagnetic radiation signal of visible light 172 as a way to know where the device is pointed and what location is being acquired when the device is operated. As such, in some examples the device 110 does not include a visual targeting scope. It should also be understood, however, in other examples the device 110 can be equipped with a visual targeting scope and a person can look therethrough and aim the device 110 via cross-hairs or other targeting indicators associated with the targeting scope.

Figure 2:
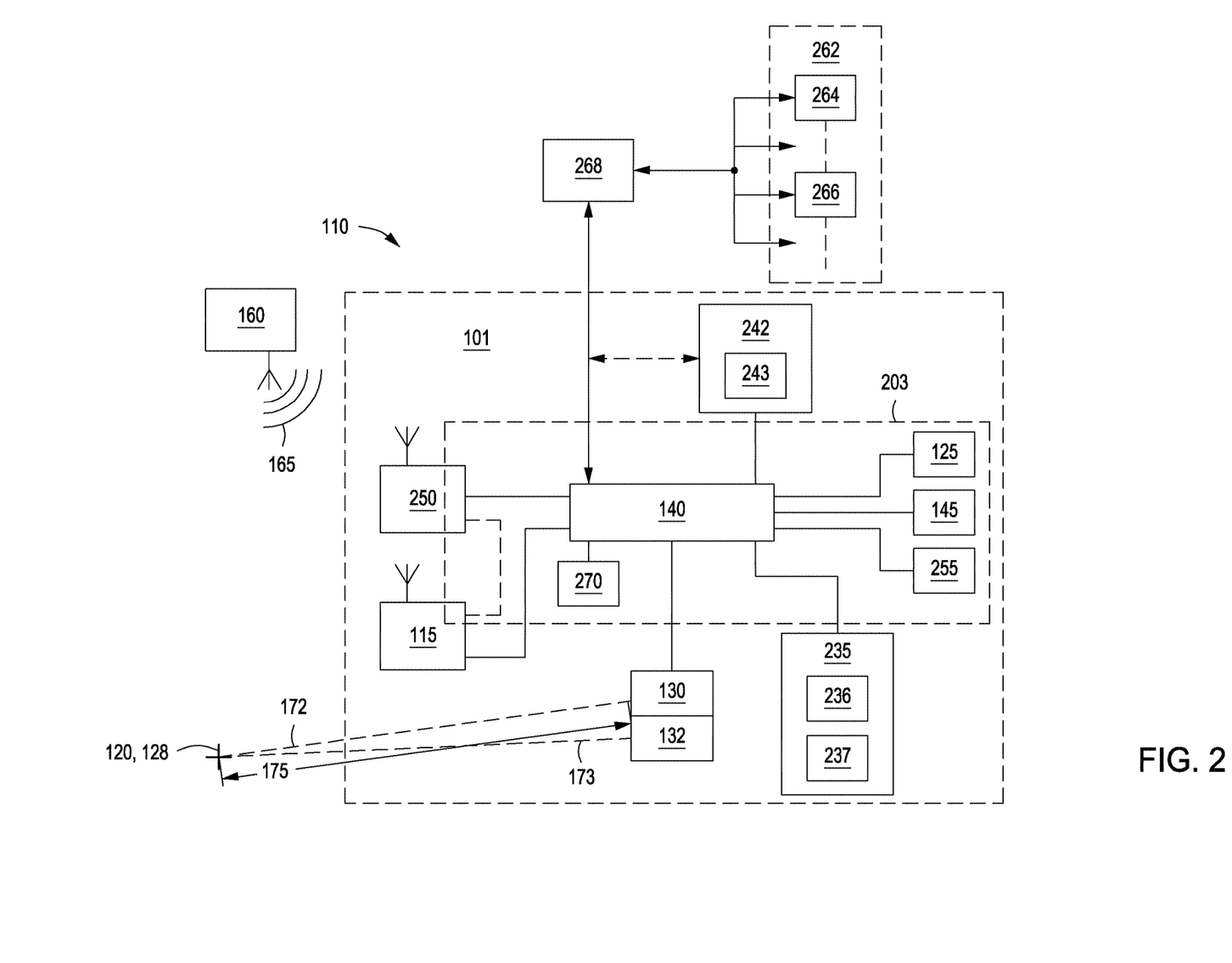
FIG. 2 depicts an illustrative schematic diagram of the device depicted in FIG. 1, according to one or more embodiments described.

FIG. 2 depicts an illustrative schematic diagram of the device 110 depicted in FIG. 1, according to one or more embodiments. The device 110 can include electronic and/or mechanical components disposed within, on, around, or otherwise about the enclosure 101. In some examples, the enclosure 101 can be portable and can be sized to be handheld. In some examples, the enclosure 101 can be an automobile, a drone, an airplane, a helicopter, a boat, a submersible vehicle, or a trenching machine. In other examples, the enclosure 101 can be integrated with or otherwise disposed on an automobile, a drone, an airplane, a helicopter, a boat, a submersible vehicle, or a trenching machine. The device 110 also can be used by a remotely controlled mechanical system, an artificial intelligence system, or any mechanical or electronic device or system that is capable of supporting the device 110 and/or operating the device 110 locally and/or remotely.

The electronic and/or mechanical components depicted as boxes within enclosure 101 can be or can include, but are not limited to, one or more memory modules 242, one or more triggers 270, one or more cameras 235, one or more position correction receivers 250, and/or one or more power sources 255. One or more of the electronic and/or mechanical components can be disposed on, integrated with, and/or electrically connected to a main board 203 disposed within the enclosure 101.

The camera 235 can be or can include one or more lenses 236 and one or more sensors 237 upon which the one or more lenses 236 can focus light for recording visual information. The sensor 237 can include a grid of tiny photosites that are sensitive to light. For example, the sensor 237 can include millions of photosites for collecting light for use in recording visual information. The camera 235 can be utilized to take electronic photographs. For example, the camera 235 can be utilized to take electronic photographs of the surface 128. The camera 235 can act as a receiver for the pulse reflected 173 off the surface 128.

The power source 255 can be or can include any known power source. For example, the one or more power sources 255 can be one or more power supplies utilizing one or more batteries, one or more power supplies utilizing electricity provided by one or more electrical cables, and/or any known power source capable of delivering power to the device 110.

The position correction receiver 250 can include one or more correction algorithms, one or more real-time kinematics (RTK) modules, one or more precise point position (PPP) modules, and/or one or more modules that can determine position correction data for use in improving the accuracy of the geographic coordinates determined for the one or more receivers 115 and/or the device 110. Position correction data can be generated utilizing pseudorange (code based) position estimates, differential positioning techniques, and/or ambiguity resolution from multiple satellite signal observations along with any other known correction techniques. Other correction techniques can include dual-frequency operation where the first order ionospheric delay can be reduced or eliminated by using a combination of dual-frequency NSS measurements, incorporation of external error correction data broadcast to the one or more receivers 115, and/or the utilization of PPP filter algorithms. The technical principle of PPP is that measurement errors can be mitigated or removed from the geographic coordinate calculations using modeling techniques and correction products such as precise satellite orbit and clock corrections. NSS corrections can be generated using data from a global reference network and the corrections can be applied anywhere on the Earth. It should be noted that although the one or more position correction receivers 250 and the one or more receivers 115 are depicted separately in FIG. 2, the position correction receivers 250 and receivers 115 can be integrated together and/or can be integrated into the CPU 140.

The one or more central processing units (CPUs) 140 can include and/or execute one or more software packages and/or algorithms for operating the device 110 and/or calculating geographic coordinates. The one or more CPUs 140 can also be or include a memory 242 as well as interfaces to the additional input/output devices as depicted in FIG. 2. The one or more CPUs 140 and/or the memory 242 can interface with external databases, a distributed system 262 of at least one computer with memory 264 and/or at least one storage device with memory 266, or the internet via the network interface 268. The distributed system 262 can include one or more databases where data can be stored for retrieval by the one or more CPUs 140. Data can be transmitted between the one or more CPUs 140 and the external databases and/or the distributed system 262. It should be understood that the term "network interface" does not indicate a limitation to interfaces that use only hardline connections and refers to all possible external interfaces, wired or wireless. For example, a distributed system 262 of at least one computer with memory 264 and/or at least one storage device with memory 266 can interface with the one or more CPUs 140 and/or memory 242 via the network interface 268 using connection protocols such as a Personal Computer Memory Card International Association (PCM-CIA) connection, Peripheral Component Interconnect (PCI) connection, PCI Express connection, Universal Serial Bus (USB) port, IEEE 1394 or "FIREWIRE" port, wireless versions of any connection protocols, or other computer interface connection protocols or technology known in the art or that may be available in the future.

It should be understood that even though the one or more CPUs 140 are shown as a platform on which the processes or methods described herein can be performed, the methods described can be performed on any platform. For example, the many and varied embodiments described herein can be used on any device that has computing and/or electronic memory capability. These devices can be or can include, but are not limited to and are presented for illustrative purposes only, storage devices with memory, distributed computer networks, or any other device or system upon which a user can store data and/or execute a software program.

An operating system 243 can be stored on the memory 242. The operating system 243 can facilitate control and execution of software using the CPU 140. Any of the available operating systems may be used in this manner including WINDOWS, LINUX, ANDROID, APPLE IOS, APPLE OS, UNIX, related server operating system versions of each respective operating system, customer operating systems, and the like. In some examples, the one or more CPUs 140 can execute software algorithms. The software algorithms can be utilized to calculate the distance 172 of the surface 128 from the device 110 and can calculate geographic coordinates associated with the surface 128 based on the distance 172 of the surface 128 from the device and the geographic coordinates associated with the location of the device 110.

Suitable memory devices include without limitation, and for illustrative purposes only: hard drives, disk drives such as digital video disk and/or compact disk drives, random access memory, read only memory, electronically erasable programmable read only memory, tape drives, flash memory, thumb drives, mini-drives, micro-drives, and any other memory device. Those skilled in the art are familiar with the many variations that can be employed using memory devices and no limitations should be imposed on the embodiments described herein due to memory device configurations and/or algorithm prosecution techniques.

The trigger 270 can be or can include one or more mechanical and/or one or more electronic devices and can incorporate software for trigger 270 activation and/or operation, and/or combinations thereof. In some examples, the trigger 270 can include one or more sensors that can detect and be activated by objects, such as a finger, entering a field of view of the sensor. The trigger 270 can be single stage or multi-stage in its operation. In some examples, a multi-stage trigger 270 can include two stages, where the first stage can be actuated by moving the trigger 270 to a first location or position and the second stage can be actuated by moving the trigger 270 to a second location or position. The one or more triggers 270 can be utilized to initiate the operation of and/or send signals to the one or more navigation satellite system (NSS) receivers 115, the one or more real time clocks 125, the one or more signal generators 130, the one or more central processing units (CPUs) 140, the one or more memory modules 242, the one or more inertial measurement units 145, the one or more cameras 235, the one or more position correction receivers 250, and/or the one or more power sources 255. In some examples, at least one multi-stage trigger 270 can be actuated to the first location or position to initiate the operation of the one or more signal generators 130. The at least one multi-stage trigger 270 can be actuated to the second location or position to initiate the operation of the one or more navigation satellite system (NSS) receivers 115, the one or more real time clocks 125, the one or more central processing units (CPUs) 140, the one or more memory modules 242, the one or more inertial measurement units 145, and/or the one or more position correction receivers 250 to determine the geographic coordinates of the device 110 and/or the surface 128 at a point in time. In some examples, the multi-stage trigger 270 can include two stages, where the first stage can be configured to activate the signal generator 130 and the second stage can be configured to send a command to the central processing unit 140 to calculate the geographic coordinates of the object 120 and/or the surface 128.

In at least one example, when the trigger 270 is initiated, the one or more CPUs 140 can activate and/or query the one or more receivers 115 and the one or more real-time clocks 125 to determine the geographic coordinates of the device 110. From the location data 165 obtained by the receiver 115 and time provided by the real-time clock 125, the central processing unit 140 can be configured or adapted to calculate the geographic coordinates (i.e., the geolocation) of the device 110. The geographic coordinates for the device 110 can include the latitude, longitude, and elevation of the device 110 at a point in time, the GPS coordinates of the device 110 at a point in time, the GLONASS coordinates of the device 110 at a point in time, the Galileo coordinates of the device 110 at a point in time, BeiDou NSS or BeiDou-2 GNSS coordinates of the device 110 at a point in time, the NAVIC NSS coordinates of the device 110 at a point in time, and/or any other NSS coordinates of the device 110 at a point in time. The one or more CPUs 140 can activate and/or query the signal generator 130 and the real-time clock 125 to determine, at a given point in time, the distance 175 of the surface 128 from the device 110. The one or more CPUs 140 can activate and/or query the inertial measurement unit 145 and the real-time clock 125 to determine the orientation of the device 110 at a given time. The one or more CPUs 140 can activate and/or query the position correction receiver 250 to provide correction information for improving the accuracy of the geographic coordinates for the device 110. In one or more embodiments, the one or more CPUs 140 can utilize the geographic coordinates of the device 110, the correction information for the geographic coordinates for the device 110, the distance 175, and the orientation of the device 110 to determine the geographic coordinates of the surface 128. Those skilled in the art will understand that there are many configurations and variations for the device 110 and it should be understood that the device 110 as depicted is not meant to limit the configurations within which the many embodiments, as described herein, can be employed.

Figure 3:
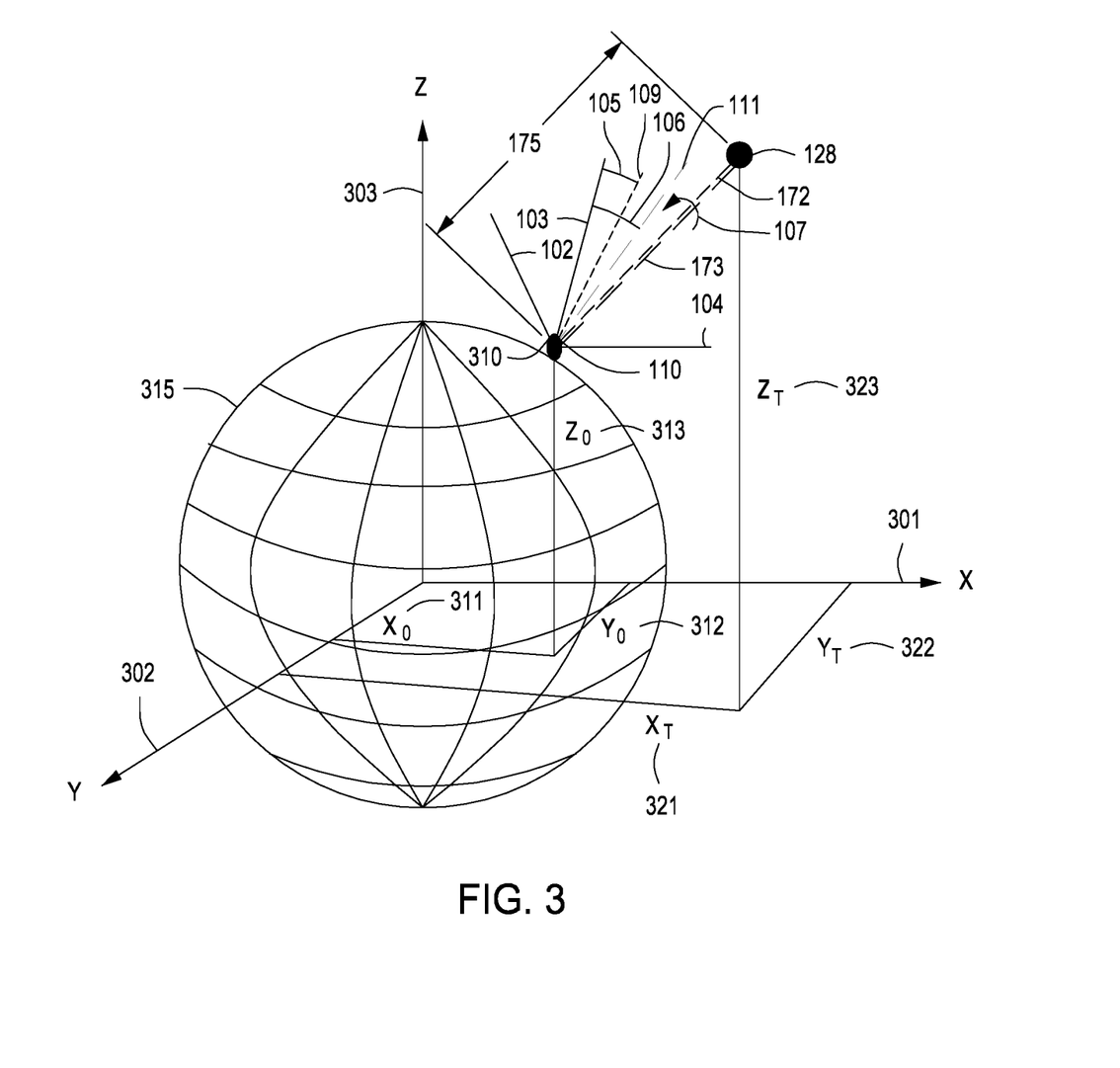
FIG. 3 depicts the device in relation to an Earth-Centered, Earth Fixed (ECEF) coordinate system, according to one or more embodiments described.

Considering how the central processing unit 140 calculates or otherwise provides the geographic coordinates of the object 120 in more detail, FIG. 3 is provided. FIG. 3 depicts the device 110 in relation to an Earth-Centered, Earth Fixed (ECEF) coordinate system 315, according to one or more embodiments. The geographic coordinates for the object 120 or the one or more surfaces 128 on the object 120 can be calculated utilizing the distance 175 ($d$), pitch 105 ($\varphi$), yaw 106 (H), and roll 107 ($\theta$) relative to the surface 128 from a position 310 of the device 110 given by latitude ($\varphi_o$), longitude ($\lambda_o$) and elevation ($h_o$) on a Geographic Coordinate System. In some examples, the elevation ($h_o$) can be an altitude or a WGS-84 height.

The position of the device 110 given by latitude ($\varphi_o$), longitude ($\lambda_o$), and elevation ($h_o$) can be converted to a point in the ECEF coordinate system. The ECEF coordinate system represents positions as an X—301, Y—302, and Z—303 coordinate in which point (0,0,0) is defined as the center of mass of the Earth. Let $X_o$—311, $Y_o$—312, and $Z_o$—313 be the Cartesian coordinates of the device 110 in the ECEF coordinate system and their values are given by the following formulas.

$$X_0 = (R_N + h_0)\cos\varphi_0 \cos\lambda_0 \qquad (1).$$

$$Y_0 = (R_N + h_0)\cos\varphi_0 \sin\lambda_0 \qquad (2), \text{ and}$$

$$Z_0 = [R_N(1-e^2)+h_0]\sin\varphi_0 \qquad (3),$$

where $$R_N = a/\sqrt{1-e^2\sin^2\varphi_0}$$

a=Long axle of the Earth=6378.237 km in the WGS-84 ellipsoid, and
e=Eccentricity of the Earth≈0.0167.

Given the values of Xo, Yo and Zo determined in equations (1), (2) and (3), the Cartesian coordinates for the surface 128 in the ECEF coordinate system can be given by $X_T$ 321, $Y_T$ 322, and $Z_T$ 323 using the following formula:

$$\begin{bmatrix} X_T \\ Y_T \\ Z_T \end{bmatrix} = \begin{bmatrix} X_0 \\ Y_0 \\ Z_0 \end{bmatrix} + \begin{bmatrix} \cos\lambda_0 & -\sin\lambda_0\cos\varphi_0 & \sin\lambda_0\cos\varphi_0 \\ \sin\lambda_0 & \cos\lambda_0\cos\varphi_0 & -\cos\lambda_0\sin\varphi_0 \\ 0 & \sin\varphi_0 & \cos\varphi_0 \end{bmatrix} \cdot \begin{bmatrix} d\sin H \\ d\cos\phi\cos H \\ -d\sin\phi\cos H \end{bmatrix}. \qquad (4)$$

Given the $X_T$, $Y_T$ and $Z_T$, equations (1), (2) and (3) as a set of simultaneous equations within an algorithm executed by the one or more CPUs 140 of FIG. 1 to convert $X_T$ $Y_T$ and $Z_T$ to latitude ($\varphi_T$), longitude ($\lambda_T$) and elevation ($h_T$) of the surface 128 on the Geographic Coordinate System. In some examples, the elevation ($h_T$) can be an altitude or a WGS-84 height.

Figures 4, 5:
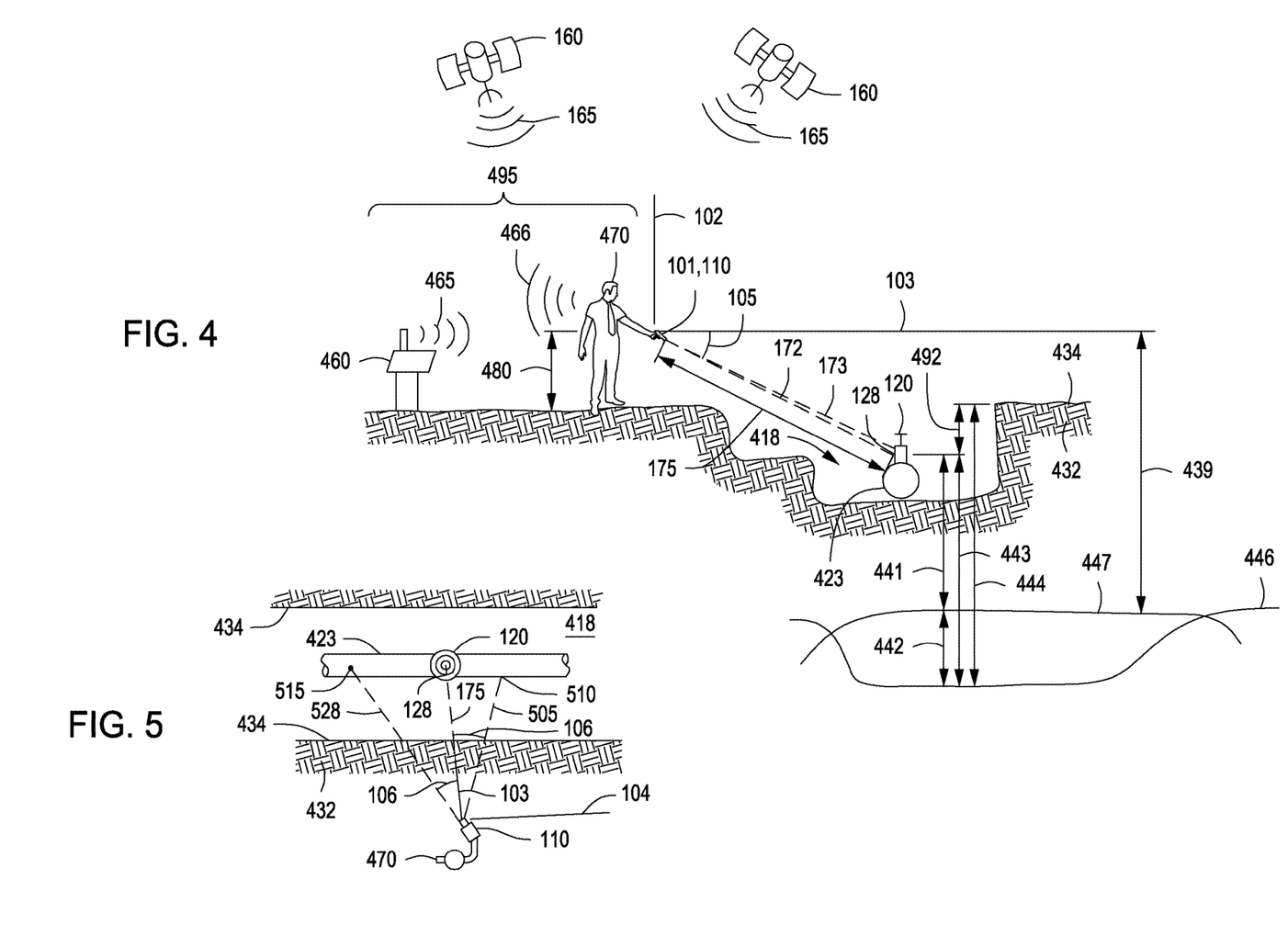
FIG. 4 depicts a side schematic view of the device being used to geo-locate an object, according to one or more embodiments described.
FIG. 5 depicts a top view of the device during use to geo-locate the surface of an object as well as a first surface and a second surface along a structure the object is disposed on, according to one or more embodiments described.

FIG. 4 depicts a side schematic view of the device 110 being used by a person 470 to geolocate a utility pipe, conduit, or other asset 423 located below a surface 434 of a land mass 432, according to one or more embodiments. As depicted, a conduit 423 can be located within a trench 418 that is dug from the land mass 432, below a surface 434 of the land mass 432. The conduit 423 can include a plurality of points 128 along its surface to be geolocated. One or more objects 120, such as a valve, weld, flange, or other component of interest along the conduit 423 can also be geolocated. So as after the trench 418 is filled and the conduit 423 is buried out of view, the precise location of the conduit 423 and its multiple objects 120 are known. As such, one can easily find the underground conduit 423 to perform maintenance operations or to avoid it when installing new utilities or structure or digging in a nearby vicinity.

In use, the device 120 can be pointed at the object 120 or a particular surface 128 along the object 120. The electromagnetic signal of visible light 172 can be emitted by actuating the trigger 270. In some embodiments, the trigger 270 can be actuated to a second stage, as described above with reference to FIG. 2, to initiate the operation of the one or more navigation satellite system (NSS) receivers 115, the one or more real time clocks 125, the one or more central processing units (CPUs) 140 for calculating a distance of the surface 128 from the device 110 and the geographic coordinates associated with the object 120, the one or more memory modules 242, the one or more inertial measurement units 145, and/or the one or more position correction receivers 250. The geographic coordinates of the object 120 or multiple points 128 along the object 120 can be stored in the device 110 and/or an external memory device. The geographic coordinates for the device 110, for example, can provide the latitude, longitude, and altitude of the device 110, including the elevation or distance 480 between the device 110 and the earth's surface 434. The altitude 439 of the device 110 can be determined relative to a reference ellipsoid 447 for a given navigation satellite system. The geographic coordinates for the object 120 can provide the altitude 441 and/or the depth 492 of the object 120 below the surface 434 and/or with reference to a sea level, not shown.

The depth 492 of the object 120 below the surface 434 can be determined using multiple techniques. For example, the altitude of the surface 434 can be determined by pointing the device 120 at the surface 434, actuating the trigger 270, and calculating the distance to the surface 128 from the device 110 and the geographic coordinates of a portion of the surface 434, including the altitude of the surface 434. The altitude of the surface 434 can be compared to the elevation of the object 120 or a particular surface 128 along the object 120 to determine the depth 492 of the object 120, or the particular surface 128, below the surface 434.

In another example, geographic coordinates and the altitude 441 of the object 120, or a particular surface 128 along the object 120, with respect to the reference ellipsoid 447, can be determined as described above. The topographic or bathymetric elevation or orthometric height 444 of the surface 434 can be related to the geoid mean sea level (MSL) 446 and can be provided from known geoid datum for the particular geographic coordinates of the object 120, or the particular surface 128 along the object 120. The geoid height 442 can also be provided. The orthometric height 443 of the object 120, or the particular surface 128 along the object 120, can be determined by taking the signed difference between the geoid height 442 and the altitude 441. The depth 492 of the object 120, or the particular surface 128 along the object 120, can be determined by taking the signed difference between the orthometric height 443 of the object 120, or the particular surface 128 along the object 120, and the orthometric height 444 of the surface 434. The distance 480 between the device 110 and the earth's surface 434 can be determined using similar techniques.

The geoid height 442 of a particular GPS coordinate can be provided from known sources. For example, the geoid height 442 for the particular GPS coordinate of the object 120, or the particular surface 128 along the object 120, with respect to the datum EGM96, can be provided from information available from UNAVCO, a non-profit university-governed consortium. In this particular case, the geoid height 442 would be a mathematically calculated value for the particular GPS coordinate of the object 120, or the particular surface 128 along the object 120.

One or more electronically available Application Program Interfaces (API) can return orthometric height 444, referenced to a geoid utilized by a particular API service provider, for particular geographic coordinates. For example, the GOOGLE Corporation provides the Google® Maps Elevation API with global coverage for both the surface of the earth and ocean floor (depth values). The elevation reported is either an elevation measurement at the precise location of the request or the averaged value of the four nearest locations. The result returned by the GOOGLE API contains "resolution" apart from the "Elevation" value. "Resolution" is an indication for the accuracy of the elevation. The resolution can be different for different GPS coordinates. The resolution value indicates the maximum distance between data points from which the elevation was interpolated. The MICROSOFT Corporation provides an elevation API along with BING Maps. The MICROSOFT API covers the whole earth surface and ocean floors with a minimum resolution of 900 meters globally (including poles), 90 meter for latitudes between 56 degrees South and 60 degrees North, and 10 meter for the United States. The result returned by the Microsoft® API contains "zoom level" apart from the elevation. The zoom level ranges from 1 to 21 and gives an indication of the accuracy of the returned results. Lower value in zoom level means less accurate results. The zoom level used depends on the amount of elevation data available in the area. AOL provides the MapQuest® API, an open elevation service providing NASA's Shuttle Radar Topography Mission (SRTM) elevation data. STRM is an international research effort that obtained digital elevation models on a near-global scale from 56 degrees South to 60 degrees North.

An optional base station 460 can be utilized in combination with the device 110 for improving the geographic coordinate determinations made by the device 110. For example, base station 460 can be used to correct the geographic coordinates generated by the device 110. For example, the base station 460 can be stationary and the device 110 can move or rove from location to location. Real Time Kinematics (RTK) corrections can be calculated based on signals 465, 466. Real Time Kinematics (RTK) is a differential NSS technique that can improve geographic coordinate accuracy performance. With RTK, the system 495 can utilize carrier wave information measurements associated with the location signals 165 and the transmission of corrections from the base station 460 to the device 110 via signals 465, so that errors in the geographic coordinates can be determined by the device 110 and can be cancelled out utilizing ambiguity resolution and differential correction of the additional information gathered by the base station 460 and transmitted to the device 110 via signal 465. The base station 460 can be publically available and permanently located at a particular stationary location or can be privately owned and moved from one temporary stationary location to another as appropriate. RTK follows the same general concept as carrier phase tracking but uses the location signal 165 emitted from the navigation satellite system 160 as its signal, ignoring the information contained within the location signal 165.

During operation of the device 110, the base station 460 can be located within a radius of about less than 10 meters to about 100 meters of the device 110. The base station 460 can be located within a radius of about 100 meters to about 1 kilometer of the device 110. The base station 460 can be located within a radius of about 1 meter to about 10 kilometers or about 20 kilometers or more of the device 110. The signals 465 can be one or more real-time communication channels and can be utilized to send correction data from the base station 460 to the device 110. Data from the base station 460 can be transmitted via signals 465 to the device 110 for use in real-time or post processing correction of geographic coordinates determined by the device 110.

FIG. 5 depicts a schematic top view of the utility pipe, conduit, or other asset 423 in FIG. 4. During operation, the device 110 can determine the distance 175, the geographic coordinates associated with the surface 128, and can record/store the distance 175 and the geographic coordinates associated with the surface 128 as well as the time and/or date the information was gathered. In some examples, the device 110 can be moved, aimed, or otherwise directed by the person 470 to a second surface 510 having a distance 505 from the device 110 to determine the geographic coordinates associated with the second surface 510, as well as the time the measurements were taken. In some examples, the device 110 can be moved, aimed, or otherwise directed by the person to a third surface 515 having a distance 528, and so on and so forth to identify the precise locations of the conduit 423 along at least a portion of its length, any components of the conduit 423, hardware, instrumentation or other parts of interest.

Any of the geographic coordinates and/or measurement times can be accessed from the device 110 via memory 242 and/or from one or more databases within the distributed system 262, or other databases not shown. Other geographic coordinates for other underground assets can also be stored in the one or more databases. At a future date, the one or more databases can be accessed to locate the object 120, the various locations along the structure 423, and the other underground assets to allow other assets to be disposed underground without disturbing the object 120, structure 423, or the other assets. For example, a trench could be dug in the land mass 432 without disturbing the conduit 423 by utilizing the geographic coordinates stored in the one or more databases to design the trench such that the associated digging avoids the object 120, structure 423, or the other assets. A pipe could be disposed in the same land mass 432 utilizing horizontal drilling techniques by designing the drilling activities utilizing the geographic coordinates stored in the one or more databases to plan the drilling path such that the associated drilling avoids the conduit 423. In other examples, a drone can access the one or more databases to locate the object 120, the various locations along the pipeline 423, and/or other assets above or below ground to allow the drone to fly over and take images, e.g., photos and/or video images, of the ground above buried objects or of assets located on the surface.

Embodiments of the present disclosure further relate to any one or more of the following paragraphs:

1. A device for determining a geolocation of an object, comprising: a receiver configured to receive a location signal from a navigation satellite system; a signal generator configured to emit an electromagnetic radiation signal of visible light onto an object to be geolocated; a detector configured to receive a reflection of the emitted electromagnetic radiation signal of visible light from the object; and a central processing unit configured to provide the geographic coordinates of the device and the geographic coordinates of the object based on the reflection of the emitted electromagnetic radiation signal of visible light from the object.

2. The device according to paragraph 1, wherein the geographic coordinates of the object and the geographic coordinates of the device each comprise a latitude, a longitude, and an elevation.

3. The device according to paragraph 2, wherein each elevation comprises an altitude or a depth relative to the surface of the earth.

4. The device according to any one of paragraphs 1 to 3, wherein the object is a pipe, a conduit, or a cable.

5. The device according to any one of paragraphs 1 to 4, wherein the electromagnetic radiation has a wavelength of about 390 nm to about 700 nm.

6. The device according to any one of paragraphs 1 to 5, further comprising a position correction receiver configured to receive Real-Time Kinematics corrections from a Real-Time Kinematics base station.

7. The device according to any one of paragraphs 1 to 6, further comprising an inertial measurement unit configured to determine a roll, a pitch, and a yaw angle for use in calculating the geographic coordinates of the object.

8. The device according to any one of paragraphs 1 to 7, further comprising a trigger configured to activate the emission of the electromagnetic radiation signal of visible light.

9. The device according to any of paragraphs 1 to 7, further comprising a trigger, wherein the trigger comprises a first stage configured to activate the emission of the electromagnetic radiation signal of visible light and a second stage configured to send a command to the central processing unit to calculate the geographic coordinates of the object.

10. The device according to any one of paragraphs 1 to 9, wherein the device is portable and sized to be hand held.

11. The device according to any one of paragraphs 1 to 10, wherein the device is disposed on an automobile, drone, airplane, helicopter, boat, submersible vehicle, or trenching machine.

12. The device according to any one of paragraphs 1 to 11, further comprising a stabilizer for reducing vibration while emitting the electromagnetic radiation signal of visible light.

13. A system for determining a location of an object, comprising: a base station; and a Real-Time Kinematics system comprising: a receiver configured to receive a location signal from a navigation satellite system; a signal generator configured to emit an electromagnetic radiation signal of visible light onto an object to be geolocated; a detector configured to receive a reflection of the emitted electromagnetic radiation signal of visible light from the object; and a central processing unit configured to provide the geographic coordinates of the device and the geographic coordinates of the object based on the reflection of the emitted electromagnetic radiation signal of visible light from the object.

14. The system according to paragraph 13, wherein the geographic coordinates of the object comprises a latitude, a longitude, and an elevation.

15. The system according to paragraph 13 or 14, wherein the electromagnetic radiation comprises laser light.

16. The system according to any one of paragraphs 13 to 15, wherein the device further comprises an inertial measurement unit configured to determine a roll, a pitch, and a yaw angle of the device for calculating the geographic coordinates of the object.

17. The system according to any one of paragraphs 13 to 16, wherein the Real-Time Kinematics system further comprises a trigger configured to activate the electromagnetic radiation signal of visible light and a stabilizer for reducing vibration while emitting the electromagnetic radiation signal.

18. The system according to any one of paragraphs 13 to 17, wherein the trigger comprises a first stage configured to activate the electromagnetic radiation signal of visible light and a second stage configured to send a command to the central processing unit to calculate the geographic coordinates of the object.

19. The system according to any one of paragraphs 13 to 18, wherein the system is disposed on an automobile, a drone, an airplane, a helicopter, a boat, a submersible vehicle, or a trenching machine.

20. The system according to any one of paragraphs 13 to 19, wherein the geographic coordinates of the object comprises a latitude, a longitude, and an altitude.

21. The system according to any one of paragraphs 13 to 19, wherein the geographic coordinates of the object comprises a latitude, a longitude, and a WGS-84 height.

22. A method for determining a location of a surface comprising: receiving a location signal from a navigation satellite system; emitting an electromagnetic radiation signal of visible light onto an object; detecting a reflection of the emitted electromagnetic radiation signal of visible light from the object; calculating geographic coordinates of the device, a distance of the object from the device, and geographic coordinates of the object; and storing the geographic coordinates of the object in a memory device.

23. The method according to paragraph 22, further comprising stabilizing the electromagnetic radiation signal of visible light.

24. The method according to paragraph 22 or 23, wherein the geographic coordinates of the object and of the device comprises a latitude, a longitude, and an elevation.

25. The method according to paragraph 24, wherein the elevation comprises an altitude or a depth relative to the surface of the earth.

26. The method according to any one of paragraphs 22 to 25, wherein the object is a pipe, conduit, or cable.

27. The method according to any one of paragraphs 22 to 26, wherein the electromagnetic radiation has a wavelength of about 390 nm to about 700 nm.

28. The method according to any one of paragraphs 22 to 27, further comprising determining a roll, a pitch, and a yaw angle for use in calculating the geographic coordinates of the object.

29. The method according to any one of paragraphs 22 to 28, wherein the electromagnetic radiation signal of visible light is emitted by activating a trigger.

30. The method according to any one of paragraphs 22 to 29, wherein activating the trigger comprises activating a first stage that activates the electromagnetic radiation signal of visible light and activating a second stage that sends a command to a central processing unit to calculate the geographic coordinates of the object.

Certain embodiments and features have been described using a set of numerical upper limits and a set of numerical lower limits. It should be appreciated that ranges including the combination of any two values, e.g., the combination of any lower value with any upper value, the combination of any two lower values, and/or the combination of any two upper values are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention may be devised without departing from the basic scope thereof, and the scope thereof is determined by the claims that follow.

What is claimed is:

1. A hand held device for geolocation of a buried object, comprising:
an enclosure for containing:
a receiver configured to receive a location signal from a navigation satellite system;
a signal generator configured to emit an electromagnetic radiation signal of visible light onto an object to be buried;
a detector configured to receive a reflection of the emitted electromagnetic radiation signal of visible light from the object;
an inertial measurement unit configured to determine a roll, a pitch, and a yaw angle;
a stabilizer for reducing vibration while emitting the electromagnetic radiation signal of visible light;
a central processing unit configured to provide geographic coordinates of the device and geographic coordinates of the object based on the location signal,
the reflection of the emitted electromagnetic radiation signal of visible light from the object, and the roll, pitch, and yaw angles; and
a memory device configured to store and provide to a user the geographic coordinates of the object subsequent the object being buried;
a grip extending from the enclosure, the enclosure and grip sized to be held and supported with one hand of the user; and
a trigger exterior of the enclosure and proximate the grip, the trigger configured to activate operation of any one or more of the receiver, signal generator, detector, central processing unit, and memory device;
wherein the hand held device has no visual targeting scope.

2. The device of claim 1, wherein the geographic coordinates of the object and the geographic coordinates of the device each comprise a latitude, a longitude, and an elevation.

3. The device of claim 2, wherein each elevation comprises an altitude or a depth relative to the surface of the earth.

4. The device of claim 1, wherein the object is a pipe, a conduit, or a cable within a trench.

5. The device of claim 1, wherein the electromagnetic radiation has a wavelength of about 390 nm to about 700 nm.

6. The device of claim 1, further comprising a position correction receiver configured to receive Real-Time Kinematics corrections from a Real-Time Kinematics base station.

7. The device of claim 1, wherein the trigger activates the emission of the electromagnetic radiation signal of visible light.

8. The device of claim 1, wherein the trigger comprises a first stage configured to activate the signal generator to emit the electromagnetic radiation signal of visible light and a second stage configured to activate the central processing unit to calculate the geographic coordinates of the object.

9. A method for geolocation of an object using a hand held device, comprising:
receiving a location signal from a navigation satellite system using a receiver located within the hand held device, the hand held device comprising an enclosure, a grip extending from the enclosure; and a trigger disposed proximate the grip, the device designed to be held and supported with one hand and wherein the device has no visual targeting scope;
determining roll, pitch, and yaw using an inertial measurement unit located within the hand held device;
aiming the hand held device at an object to be subsequently buried;
emitting an electromagnetic radiation signal of visible light from a signal generator located within the enclosure onto the object to be subsequently buried by moving the trigger to activate the signal generator, wherein the object is illuminated with the emitted electromagnetic radiation signal of visible light;
detecting a reflection of the emitted electromagnetic radiation signal of visible light from the object using a detector located within the enclosure;
calculating geographic coordinates of the device based on the location signal, a distance of the object from the device based on the detected reflection, and geographic coordinates of the object based on the geographic coordinates of the device, the distance, and the roll, pitch, and yaw, using a central processing unit located within the enclosure;
storing the geographic coordinates of the object in a memory device located within the enclosure; and
stabilizing the electromagnetic radiation signal of visible light using a stabilizer within the enclosure; all while holding the hand held device in one hand.

10. The device of claim 1, wherein the trigger is an electronic trigger.

11. The device of claim 1, wherein the trigger is a mechanical trigger.

12. The device of claim 1, wherein the electromagnetic radiation signal has sufficient energy to illuminate the object to be buried.

13. The method of claim 9, further comprising recovering the geographic coordinates to geolocate the object after the object is buried.

14. The device of claim 1, wherein the device is pistol shaped.

15. The device of claim 1, wherein the geographic coordinates of the device are determined from an Earth Centered, Earth Fixed (ECEF) coordinate system to calculate depth of the object relative to the center of mass of the Earth.

16. The method of claim 9, wherein the geographic coordinates of the device are determined from an Earth Centered, Earth Fixed (ECEF) coordinate system to calculate depth of the object relative to the center of mass of the Earth.

* * * * *